(12) United States Patent
Oku

(10) Patent No.: US 8,898,650 B2
(45) Date of Patent: Nov. 25, 2014

(54) TECHNIQUE TO ACTUALIZE A HIGH-SPEED ACCESS TO A PROPERTY WHEN EXECUTING A COMPILED OBJECT CODE IN A STATIC COMPILER

(71) Applicant: DeNA Co., Ltd., Tokyo (JP)

(72) Inventor: Kazuho Oku, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/028,641

(22) Filed: Sep. 17, 2013

(65) Prior Publication Data

US 2014/0215447 A1 Jul. 31, 2014

(30) Foreign Application Priority Data

Jan. 31, 2013 (JP) .................................. 2013-016698

(51) Int. Cl.
*G06F 9/45* (2006.01)
(52) U.S. Cl.
CPC .......................................... *G06F 8/41* (2013.01)
USPC ........................................................ 717/140
(58) Field of Classification Search
CPC .......... G06F 8/41; G06F 8/443; G06F 8/4441

USPC .................................................. 717/140–161
See application file for complete search history.

(56) References Cited

U.S. PATENT DOCUMENTS

| 5,848,423 | A  | * | 12/1998 | Ebrahim et al. ......................... 1/1 |
| 7,373,639 | B2 | * | 5/2008  | Halstead et al. ............... 717/140 |
| 7,401,327 | B2 | * | 7/2008  | Halstead et al. ............... 717/140 |
| 7,730,462 | B2 | * | 6/2010  | Grieskamp et al. ............ 717/136 |
| 8,108,437 | B2 | * | 1/2012  | Helfman ........................ 707/801 |
| 8,244,775 | B1 |   | 8/2012  | Bak et al. |
| 2002/0100033 | A1 | * | 7/2002 | Halstead et al. ............... 717/162 |
| 2002/0112229 | A1 | * | 8/2002 | Halstead et al. ............... 717/162 |
| 2005/0166181 | A1 | * | 7/2005 | Grieskamp et al. ............ 717/114 |
| 2009/0313208 | A1 | * | 12/2009 | Helfman ........................... 707/2 |
| 2010/0306742 | A1 | * | 12/2010 | Schneider ...................... 717/120 |

* cited by examiner

*Primary Examiner* — Qing Chen
(74) *Attorney, Agent, or Firm* — IPUSA, PLLC

(57) ABSTRACT

A data processing apparatus that generates an object code from a source code, includes a unit that sets, for an access to a property of an object included in the source code, an offset of a one-dimensional array that stores a value in correspondence with a property in an offset table of hidden type data provided to correspond to the object, and accesses the property via the offset table.

2 Claims, 13 Drawing Sheets

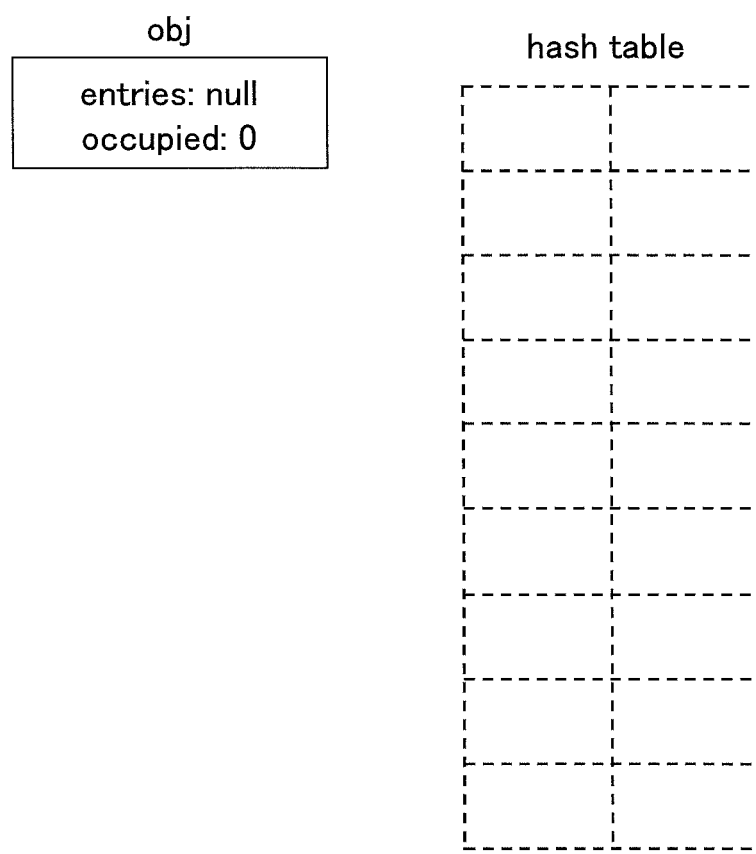

source code

```
obj = {};
obj.x = 123;
obj.y = 456;
```

FIG.10A

```
d1 {  hiddenType = obj->hiddenType;
      if (hiddenType->fastOffsetTable[fastSlot].id == SYM_id) {
         // HIGH-SPEED ACCESS
d2 {  value = obj->entries[hiddenType->fastOffsetTable[fastSlot].offset];
      } else {
d3 {  value = SlowLookup(obj, id);
      }
```

FIG.10B

```
     function SlowLookup(obj, id) {
d11 {  slot = HASH_TABLE_LOOKUP(obj->hiddenType->offsetHashTable, id);
       if (slot != NULL) {
          // VALUE FOUND
d12 {     return obj->entries[slot];
       } else {
d13 {     return NOT_FOUND;
       }
     }
```

FIG.11A

```
hiddenType = obj->hiddenType;
if (hiddenType->fastOffsetTable[fastSlot].id == SYM_id) {
    // HIGH-SPEED ACCESS
    obj->entries[hiddenType->fastOffsetTable[fastSlot].offset] = value;
} else if (hiddenType->fastOffsetTable[fastSlot].id != SYM_null
        && (slot = HASH_TABLE_LOOKUP(hiddenType->offsetHashTable, id)) != null) {
    // OVERWRITTEN AS THERE IS PROPERTY HAVING SAME NAME
    obj->entries[slot] = value;
} else {
    // NEW PROPERTY IS ADDED
    NewProperty(obj, id, value);
}
``` d21, d22, d23, d24, d25

FIG.11B

```
function NewProperty(obj, id, value) {
    // VALUE OF PROPERTY IS ADDED TO POSITION OF CURRENT NUMBER OF COMPONENTS
d31─  offset = hiddenType->offsetHashTable->occupied;
    // IF NEW HIDDEN TYPE EXISTS, HIDDEN TYPE IS OBTAINED
d32─  newHiddenType = hiddenType->lookupTransition(id);
    if (newHiddenType == NULL) {
        // IF NEW HIDDEN TYPE DOES NOT EXIST, NEW HIDDEN TYPE IS GENERATED
        // IN WHICH FAST OFFSET TABLE AND OFFSET HASH TABLE ARE COPIED
d33─      newHiddenType = hiddenType->clone();
        // NEW PROPERTY NAME AND OFFSET ARE STORED IN HASH TABLE
d34─      HASH_TABLE_INSERT(newHiddenType->offsetHashTable, id, offset);
        // FAST OFFSET TABLE IS UPDATED, IF POSSIBLE
d35─      sym_id = GET_SYM_OF_id(id);
        if (sym_id != SYM_null
            && newHiddenType->fastOffsetTable[sym_id].id == SYM_null) {
            // WHEN THERE EXISTS CORRESPONDING SYM_id, OFFSET IS STORED IN FAST OFFSET TABLE
d36─          fastSlot = sym_id mod SIZE_OF_FAST_OFFSET_TABLE;
              newHiddenType->fastOffsetTable[fastSlot].id = sym_id;
              newHiddenType->fastOffsetTable[fastSlot].offset = offset;
        }
        // NEW HIDDEN TYPE IS REGISTERED AS TRANSITION FROM CURRENT HIDDEN TYPE
d37─      hiddenType->addTransition(id, newHiddenType);
    }
    // HIDDEN TYPE REFERRED TO BY obj IS UPDATED
d38─  obj->hiddenType = newHiddenType;
    // VALUE OF PROPERTY IS ADDED AT END OF values_
d39─  obj->values_.append(value);
}
```

FIG.12 d41 — value = SlowLookup(obj, id);

FIG.13

```
slot = HASH_TABLE_LOOKUP(obj->hiddenType->offsetHashTable, id);
if (slot != null) {
    // OVERWRITTEN AS THERE IS PROPERTY HAVING SAME NAME
    obj->entries[slot] = value;
} else {
    // NEW PROPERTY IS ADDED
    NewProperty(obj, id, value);
}
``` d51, d52, d53

TECHNIQUE TO ACTUALIZE A HIGH-SPEED ACCESS TO A PROPERTY WHEN EXECUTING A COMPILED OBJECT CODE IN A STATIC COMPILER

CROSS-REFERENCE TO RELATED APPLICATION

The present application is based on and claims the benefit of priority of Japanese Priority Application No. 2013-016698 filed on Jan. 31, 2013, the entire contents of which are hereby incorporated by reference.

BACKGROUND OF THE INVENTION

1. Field of the Invention The present invention relates to a technique of compiling a source program.
2. Description of the Related Art In a dynamic programming language such as JavaScript (registered trademark), codes are rewritten by using a method so-called type inference for acceleration. For example, a method so-called Inline Cache is implemented in order to shorten time to access a property of an object (see Patent Document 1 or the like, for example).

In the Inline Cache, an access code to access a property is dynamically generated at a first access time based on hidden type data (Hidden Type) at back. Then, the generated access code is called at an access after a second time, when it is confirmed that the hidden type data is the same as that of the previous access. When a property is newly added, new hidden type data is generated and is set as hidden type data of an object.

For example, when "Point(x, y)" is newly executed in the following function of JavaScript function Point (x, y) {this.x=x; this.y=y;}, values of property x, y are written in a memory area corresponding to an offset indicated by hidden type data. By executing a code dynamically generated based on the hidden type data, an access to the property is performed.

The above described method is effective for an interpreter in which a code is generated when executing, however, cannot be applied to a compiler in which an object code is previously generated from a source code. It means that as the compiler is originally static, type inference introduced by a dynamic programming language does not suit the compiler.

Thus, in a compiler, there are many cases that a hash table is used when actualizing a high-speed access to a property of an object. In the hash table, a table is structured using an index value and a value.

FIG. 1A to FIG. 3B illustrate a relationship between an object and a hash table generated in a process of compiling
obj={ };
obj.x =123;
obj.y =456;
  as a source code.

By executing a first line "obj={ };" of the source code as illustrated in FIG. 1A, an object "obj" is generated as illustrated in FIG. 1B. At this time, a hash table is not generated yet and, a pointer "entries" to the hash table is "null" and the number of components of the property "occupied" is "0" in the object "obj".

By executing a second line "obj.x=123;" of the source code as illustrated in FIG. 2A, the hash table is generated and the pointer "entries" in the object "obj" indicates the hash table. Further, a pointer to a character string "x" (default is null) is set at an alignment component, among alignment components of the hash table, corresponding to a value of a remainder (mod) when dividing a hashed value of the character string "x" of a property "x" by the number of components of the hash table, and "123" is set as its value as illustrated in 2B. The number of components "occupied" in the object "obj" is set as "1".

By executing a third line "obj.y=456;" of the source code as illustrated in FIG. 3A, a pointer to a character string "y" is set at an alignment component, among the alignment components of the hash table, corresponding to a value of a remainder when dividing a hashed value of the character string "y" of the property "y" by the number of components of the hash table, and "456" is set as its value as illustrated in FIG. 3B. The number of components "occupied" in the object "obj" is set as "2".

A code to access the property by referring to the hash table is embedded in a compiled object code.

As described above, in a static compiler, it was necessary to use a hash table in order to actualize a high-speed access to a property when executing a compiled object code, and there was a limitation in actualizing acceleration. It means that when the hash table is used, as time is required for a matching process for generating index values or searching the hash table, a sufficient acceleration cannot be actualized.

PATENT DOCUMENT

[Patent Document 1] U.S. Pat. No. 8,244,775 B1

SUMMARY OF THE INVENTION

The present invention is made in light of the above problems, and provides a technique to actualize a high-speed access to a property when executing a compiled object code in a static compiler.

According to an embodiment, there is provided a data processing apparatus that generates an object code from a source code, including a unit that sets, for an access to a property of an object included in the source code, an offset of a one-dimensional array that stores a value in correspondence with a property in an offset table of hidden type data provided to correspond to the object, and accesses the property via the offset table.

BRIEF DESCRIPTION OF THE DRAWINGS

Other objects, features and advantages of the present invention will become more apparent from the following detailed description when read in conjunction with the accompanying drawings.

FIG. 1A and FIG. 1B are views (first) illustrating an example of acceleration by a conventional hash table;

FIG. 10A and FIG. 10B are views (first) illustrating an example of a generated code;

FIG. 11A and FIG. 11B are views (second) illustrating an example of a generated code;

FIG. 12 is a view (third) illustrating an example of a generated code; and

FIG. 13 is a view (fourth) illustrating an example of a generated code.

DETAILED DESCRIPTION OF THE PREFERRED EMBODIMENTS

Figures 2A, 2B:
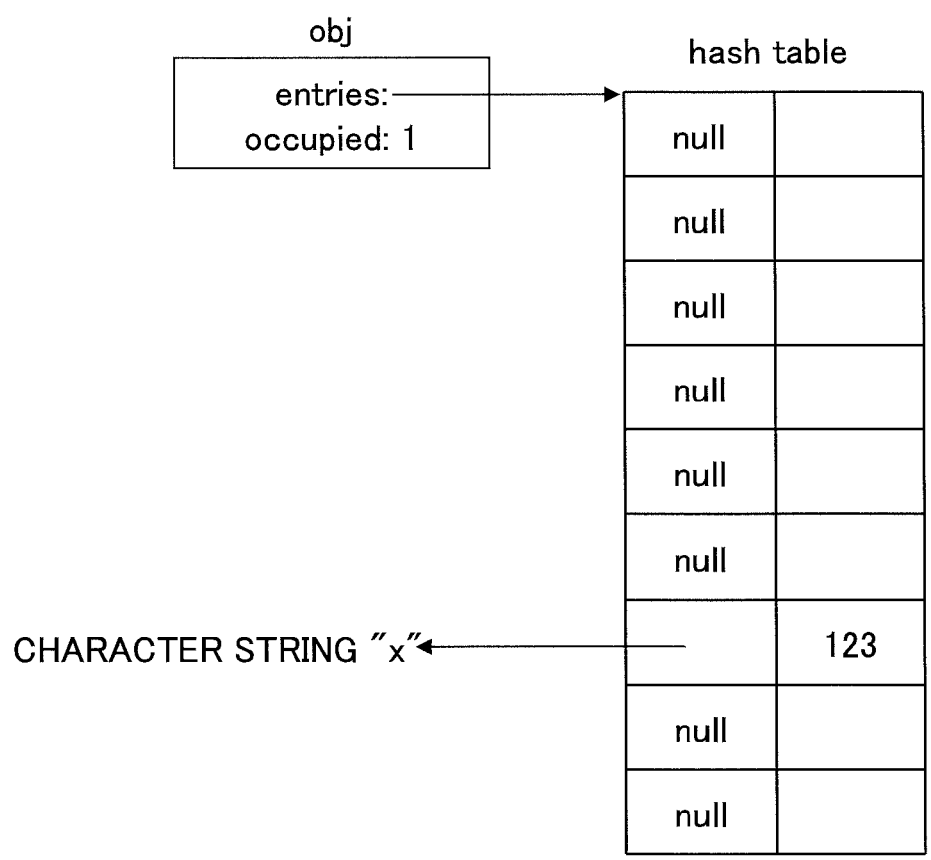
FIG. 2A and FIG. 2B are views (second) illustrating an example of acceleration by a conventional hash table.
Figure 3A:
FIG. 3A and FIG. 3B are views (third) illustrating an example of acceleration by a conventional hash table.
Figure 3B:
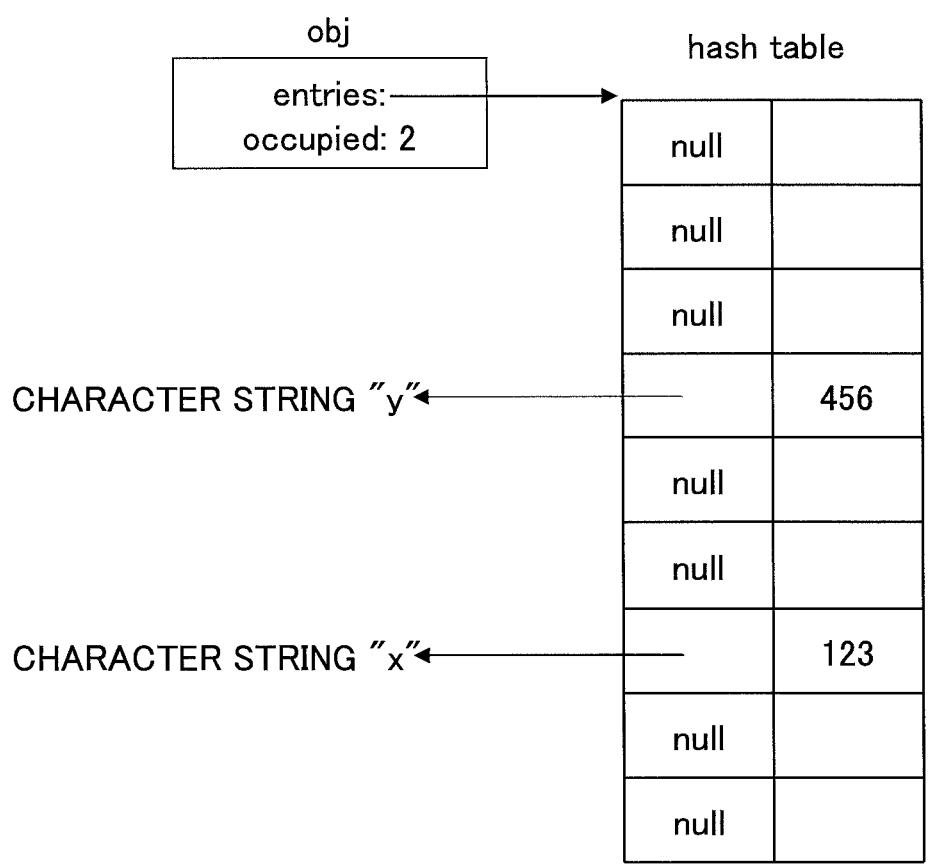

The invention will be described herein with reference to illustrative embodiments. It is to be noted that, in the explanation of the drawings, the same components are given the same reference numerals, and explanations are not repeated.
(Structure)

Figure 4:
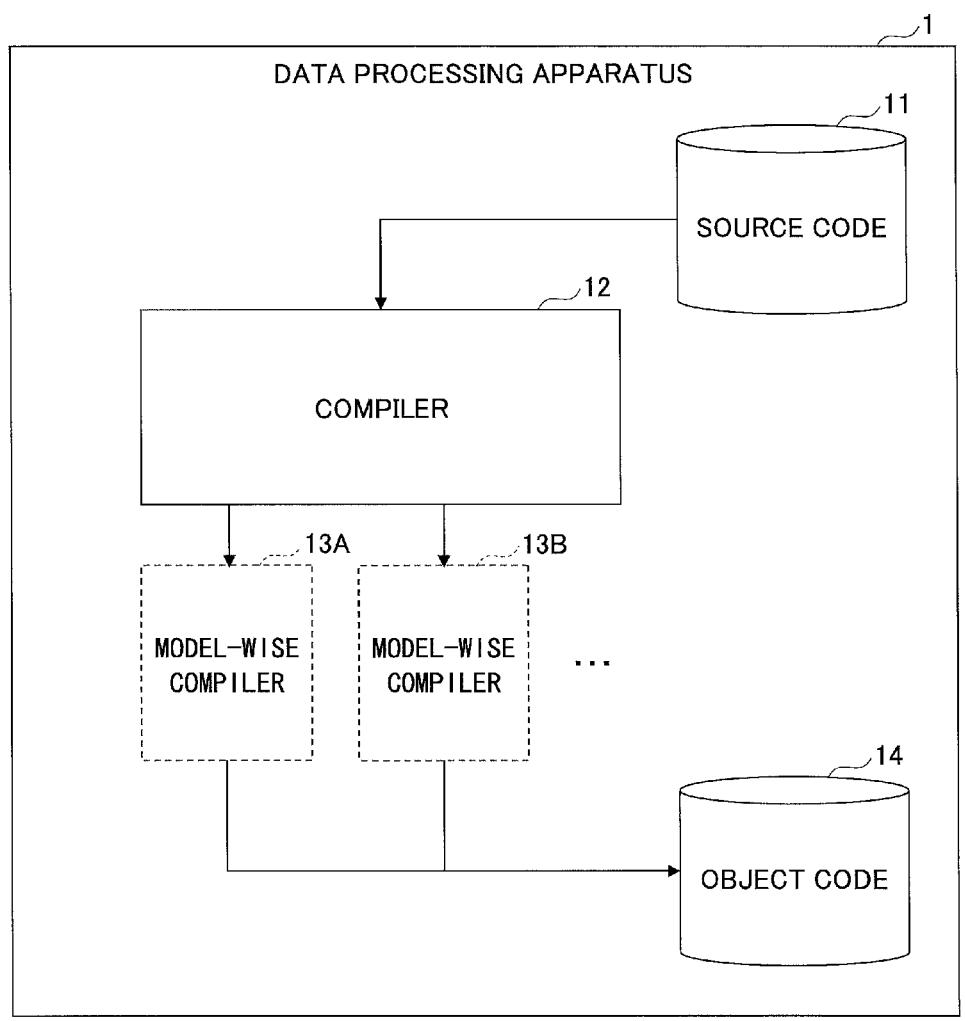
FIG. 4 is a view illustrating an example of a structure of a data processing apparatus of an embodiment.

FIG. 4 is an example of a structure of a data processing apparatus 1 of an embodiment.

In FIG. 4, the data processing apparatus 1 is provided with a compiler 12 that reads a source code 11 and compiles it to generate an object code 14. The compiler 12 may be one that directly generates the object code 14, or alternatively, one that firstly generates a code such as C++ or the like and then further compiles it by a model-wise compiler 13A or 13B for iOS or Android to generate the object code 14.

Figure 5:
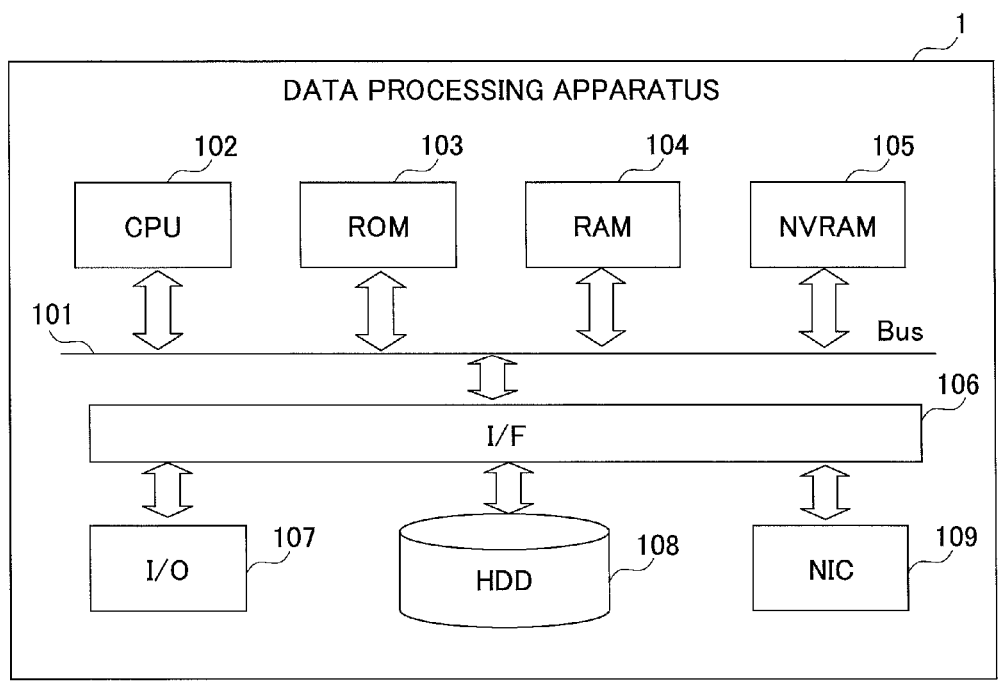
FIG. 5 is a view illustrating an example of a hardware structure of the data processing apparatus.
Figure 6:
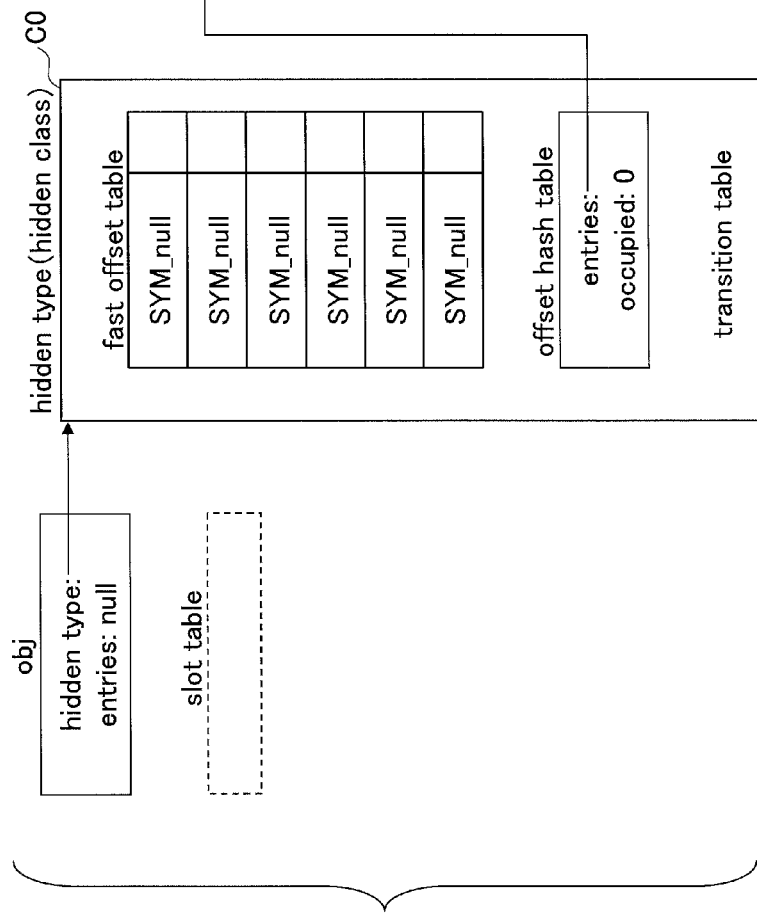
FIG. 6A and FIG. 6B are views (first) illustrating an example of a table used by a generated code.
Figure 7:
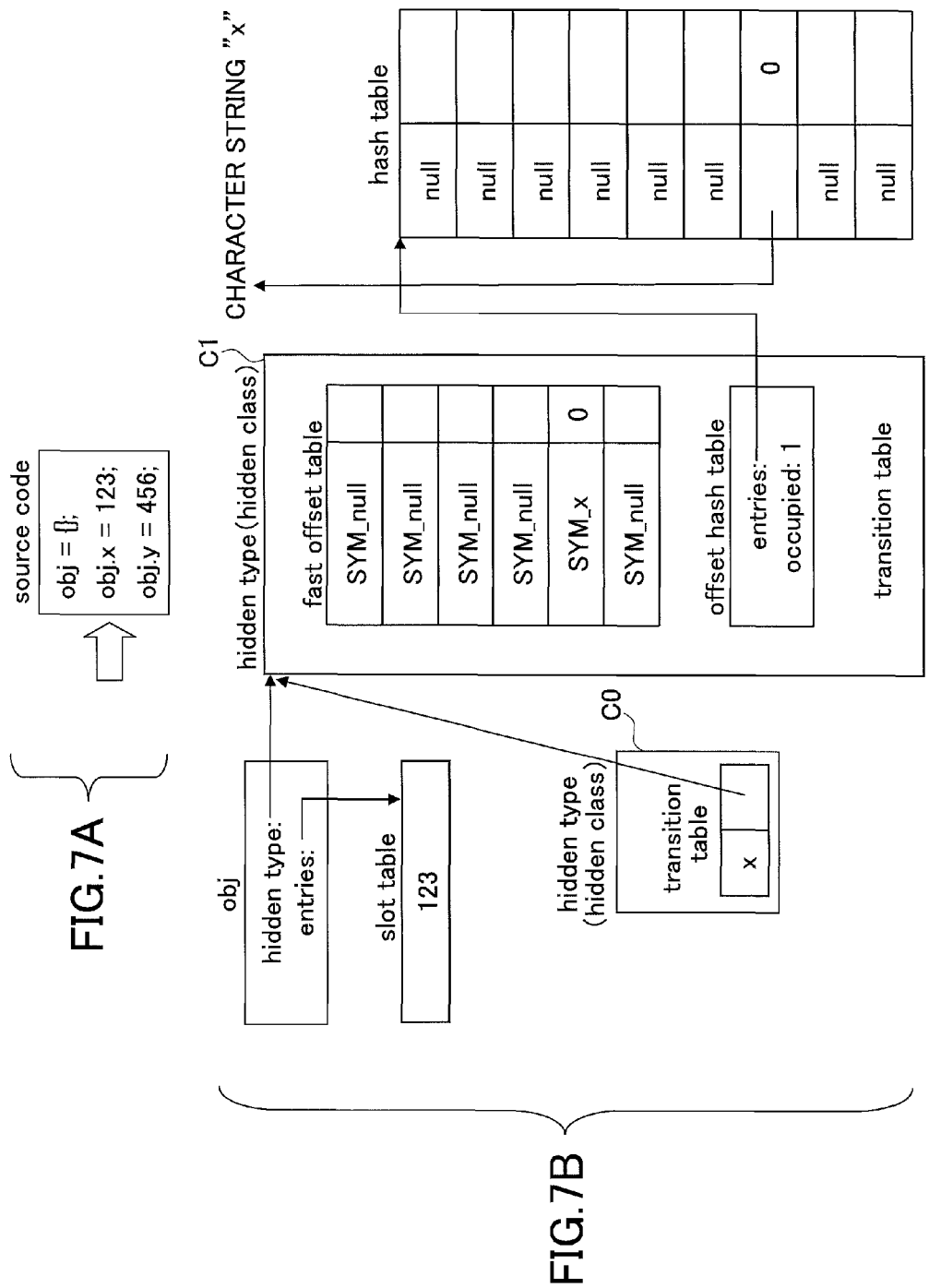
FIG. 7A and FIG. 7B are views (second) illustrating an example of a table used by a generated code.
Figure 8:
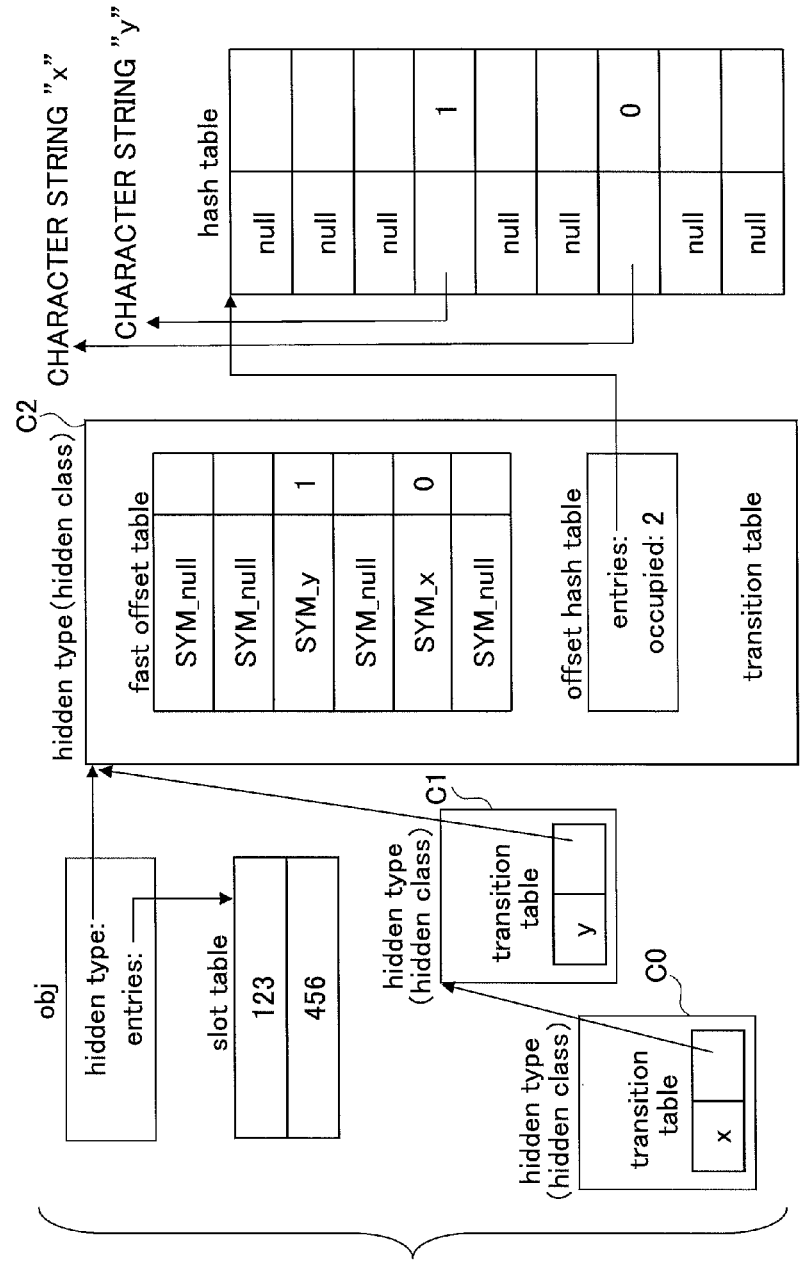
FIG. 8A and FIG. 8B are views (third) illustrating an example of a table used by a generated code.

FIG. 5 is a view illustrating an example of a hardware structure of the data processing apparatus 1.

In FIG. 5, the data processing apparatus 1 includes a CPU (Central Processing Unit) 102, a ROM (Read Only Memory) 103, a RAM (Random Access Memory) 104, an NVRAM (Non-Volatile Random Access Memory) 105 and an I/F (Interface) 106 connected to a system bus 101, and an I/O (Input/Output Device) 107 such as a keyboard, a mouse, a monitor, a CD/DVD (Compact Disk/Digital Versatile Disk) drive or the like, an HDD (Hard Disk Drive) 108, an NIC (Network Interface Card) 109 or the like connected to the I/F 106.
(Operation)

FIG. 6A to FIG. 8B illustrate an example of a relationship between an object, hidden type data and a hash table generated in a process of compiling obj={ };
obj.x=123;
obj.y=456;

as a source code. These data and table are included in an object code, which is a compiled result.

By executing a first line "obj={ };" of the source code as illustrated in FIG. 6A, an object "obj" is generated as illustrated in FIG. 6B. A pointer "hidden type" of the object "obj" indicates hidden type data (hidden type, hidden class) C0, which is a basic, and a pointer "entries" of the object "obj" that indicates a slot table (one-dimensional array) is "null".

The hidden type data (hidden type) C0 includes a fast offset table, an offset hash table and a transition table. A first column of the fast offset table is, as an initial state, "SYM_null" that indicates a number (that does not overlap numbers allocated to respective identifiers in a numbering process, which will be explained later) allocated to identifier that is not any specific identifiers (identifiers of properties). A second column of the fast offset table is blank. The pointer "entries" of the offset hash table indicates the hash table and the number of components "occupied" is "0". A first column of the hash table is "null" and a second column of the hash table is blank. The reason why the hash table is provided is to deal with cases when a collision occurs in the fast offset table, and when the property is accessed by a character string.

By executing a second line "obj.x=123;" of the source code as illustrated in FIG. 7A, the hidden type data (hidden type) C0 is copied (cloned) and hidden type data (hidden type) C1 is generated as illustrated in FIG. 7B. The pointer "hidden type" of the object "obj" indicates the hidden type data (hidden type) C1 and the pointer "entries" of the object "obj" indicates the slot table. In the transition table of the previous hidden type data (hidden type) C0, a pointer to the hidden type data (hidden type) C1 is set in correspondence with a character string "x" of the property.

In a first column of the fast offset table of the hidden type data (hidden type) C1, at a predetermined alignment component (an alignment component corresponding to a value of a remainder (mod) when dividing a value numbered for identifier of the property (identifier using "." operator) when previously scanning the source code from the top by the number of components of the fast offset table), a value SYM_x (id number value) that is numbered for the identifier is set, and in a second column thereof, a corresponding offset (at this time, "0" as it is the first property) of the slot table is set. In a corresponding offset area of the slot table, a value of the property "123" is set.

In a first column of the hash table, at an alignment component (an alignment component corresponding to a value of a remainder when dividing a hashed value of the character string "x" of the property "x" by the number of components of the hash table), a pointer to the character string "x" is set and in a second column thereof, a corresponding offset "0" of the slot table is set.

By executing a third line "obj.y=456;" of the source code as illustrated in FIG. 8A, the hidden type data (hidden type) C1 is copied and hidden type data (hidden type) C2 is generated as illustrated in FIG. 8B. The pointer "hidden type" of the object "obj" indicates the hidden type data (hidden type) C2. In the transition table of the hidden type data (hidden type) C1, a pointer to the hidden type data (hidden type) C2 is set in correspondence with a character string "y" of the property.

In a first column of the fast offset table of the hidden type data (hidden type) C2, at a predetermined alignment component (an alignment component corresponding to a value of a remainder when dividing a value numbered for identifier of the property (identifier using "." operator) when previously scanning the source code from the top by the number of components of the fast offset table), a value SYM_y that is numbered for the identifier is set, and in a second column thereof, a corresponding offset (at this time, "1" is set as it is the second property) of the slot table is set. In a corresponding offset area of the slot table, a value of the property "456" is set.

In a first column of the hash table, at an alignment component (an alignment component corresponding to a value of a remainder when dividing a hashed value of the character string "y" of the property y by the number of components of the hash table), a pointer to the character string "y" is set and in a second column thereof, a corresponding offset "1" of the slot table is set.

Figure 9:
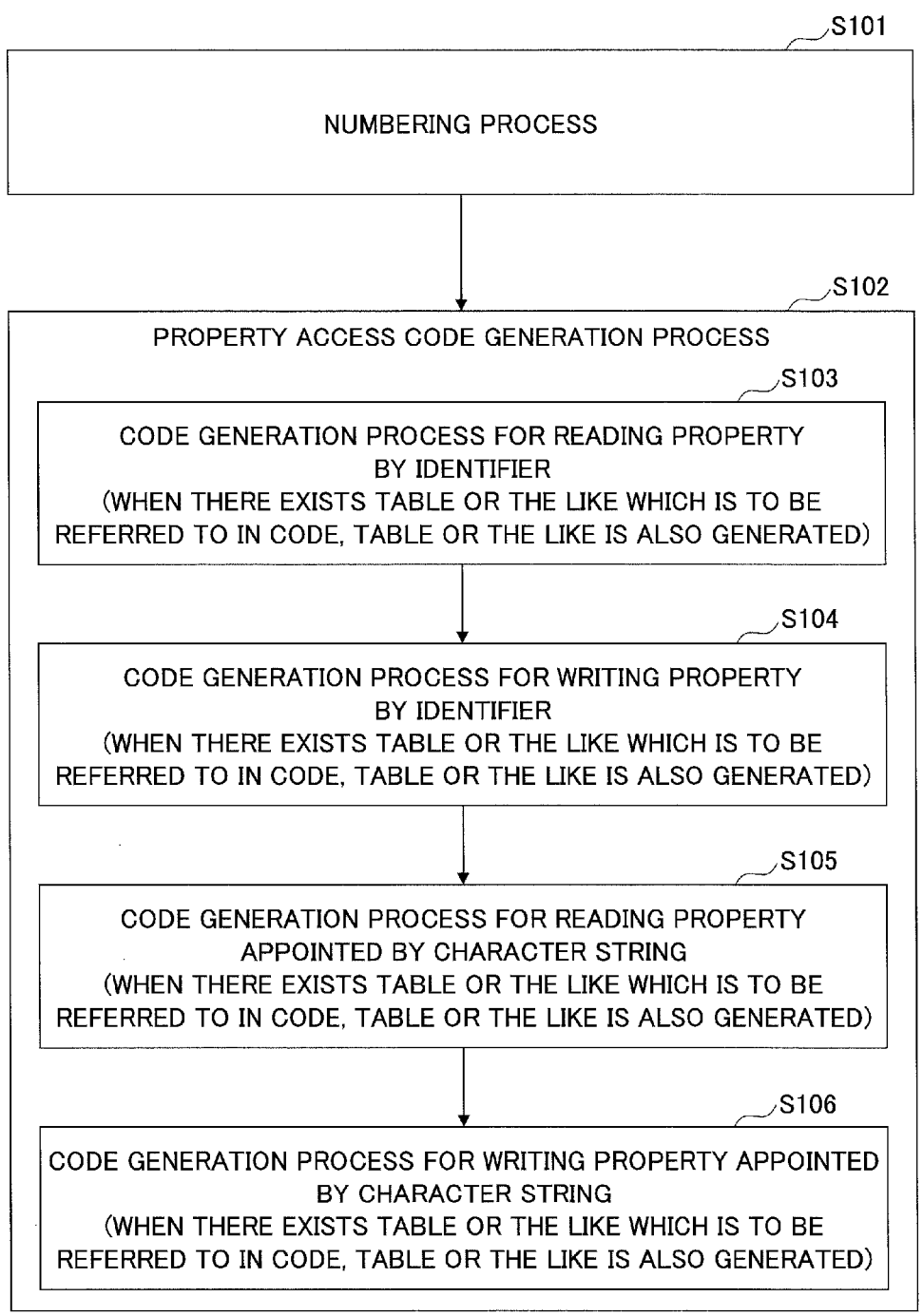
FIG. 9 is a flowchart illustrating an example of a compiling process of a property access.

FIG. 9 is a flowchart illustrating an example of a compiling process for a property access.

In FIG. 9, first, a numbering process is performed (step S101). In other words, right after parsing a source code, the parsed source code is scanned from top to bottom, and a number is allocated to an identifier, for a property access using an "." operator in a case of a JavaScript type compiler language, for example, from "1" in an ascending order. For the identifier which is already allocated by a number, the number does not change. For example, if there is a character string "pt.x" and the identifier "x" is not numbered yet, it is numbered.

Then, a property access code generation process is performed (step S102).

In the property access code generation process (step S102), a code generation process (when there exists a table or the like which is to be referred to in the code, the table or the like is also generated) for reading the property by the identifier is performed (step S103).

Specifically, for example, a code as illustrated in FIG. 10A is generated.

By a description "d1" illustrated in FIG. 10A, a value of the pointer "hidden type" of the object "obj" is set for a variable "hidden type", an id number value of a "fastSlot"th alignment component of the fast offset table of the hidden type data (hidden type) indicated by the variable "hidden type" is obtained, and whether the id number value matches the SYM_id of the property to be accessed is determined. Here, the "fastSlot" is a remainder when dividing a number (SYM_id) allocated to the identifier in the numbering process (step S101) by the number of components of the fast offset table.

When the id number value matches the SYM_id, as a high-speed process, by a description "d2", an offset value of the "fastSlot"th alignment component of the fast offset table of the hidden type data (hidden type) indicated by the variable "hidden type" in the slot table indicated by the pointer "entries" of the object "obj" is set as a read value.

When the id number value does not match the SYM_id, the high-speed process is not performed and a reading process using the hash table is performed by a description "d3".

FIG. 10B illustrates a definition of a reading process "SlowLookup(obj,id)" using the hash table.

By a description "d11" illustrated in FIG. 10B, a function "HASH_TABLE_LOOKUP" is performed accompanied with the offset hash table of the hidden type data (hidden type) indicated by the pointer "hidden type" of the object "obj" and the identifier "id" of the property, the result is set as a variable "slot", and whether the variable "slot" is not null (whether an active result is obtained) is determined.

When the variable "slot" it not null, a "slot"th value of the slot table indicated by the pointer "entries" of the object "obj" is returned by a description "d12".

When the variable "slot" is null, "NOT_FOUND" is returned by a description "d13".

Then, referring back to FIG. 9, a code generation process (when there exists a table or the like which is to be referred to in the code, the table or the like is also generated) for writing the property by the identifier is performed (step S104). Specifically, for example, a code as illustrated in FIG. 11A is generated.

By a description "d21" illustrated in FIG. 11A, a value of the pointer "hidden type" of the object "obj" is set for a variable "hidden type", an id number value of a "fastSlot"th alignment component of the fast offset table of the hidden type data (hidden type) indicated by the variable "hidden type" is obtained, and whether the id number value matches the SYM_id of the property to be accessed is determined. Similarly as described above, the "fastSlot" is a remainder when dividing a number (SYM_id) allocated to the identifier in the numbering process (step S101) by the number of components of the fast offset table.

When the id number value matches the SYM_id, as a high-speed process, by a description "d22", an offset value of the "fastSlot"th alignment component of the fast offset table of the hidden type data (hidden type) indicated by the variable "hidden type" in the slot table indicated by the pointer "entries" of the object "obj" is set as a write value.

When the id number value does not match the SYM_id, by a description "d23", whether the id number value of the "fastSlot"th alignment component of the fast offset table of the hidden type data (hidden type) indicated by the variable "hidden type" is not the SYM_null and as well as a return value "slot" of the HASH_TABLE_LOOKUP function called by the offset hash table of the hidden type data (hidden type) indicated by the variable "hidden type" and the identifier "id" is not null are determined.

When the id number value is not the SYM_null and as well as the return value "slot" of the HASH_TABLE_LOOKUP function is not null, as there already exists a property having the same name, by a description "d24", a write value is set at a position of the slot (set by the description "d23") of the slot table indicated by the pointer "entries" of the object "obj".

In other cases, by a description "d25", a new property is added.

FIG. 11B illustrates a definition of a process of adding a new property "NewProperty(obj,id,value)".

By a description "d31" illustrated in FIG. 11B, the number of components "occupied" of the offset hash table of the hidden type data (hidden type) indicated by the variable "hidden type" is set as a variable "offset".

By a description "d32", a method "lookupTransition(id)" of the hidden type data (hidden type) indicated by the variable "hidden type" is executed, a return value is set as a variable "newHiddenType" and whether the variable "newHiddenType" is null is determined. The method "lookupTransition (id)" is to track transitions described in the transition table of the hidden type data (hidden type) and search the hidden type data corresponding to the identifier "id".

When the variable "newHiddenType" is null, by a description "d33", a method "clone( )" of the hidden type data (hidden type) indicated by the variable "hidden type" is executed, and new hidden type data, which is a return value, is set as the variable "newHiddenType".

By a description "d34", a function "HASH_TABLE_INSERT" is executed by appointing the offset hash table of the hidden type data (hidden type) indicated by the variable "newHiddenType", the identifier "id" and the offset (set by the description "d31") and stores a new property name and the offset in the hash table.

By a description "d35", a function "GET_SYM_OF id(id)" is executed by appointing the identifier "id", the obtained SYM_id is set as a variable "sym_id", and whether the variable "sym_id" is not the SYM null and as well as the "sym_id"th id number value of the fast offset table of the hidden type data (hidden type) indicated by the variable "newHiddenType" is the SYM_null are determined. The function "GET_SYM_OF_id(id)" returns the corresponding id number value when the identifier "id" matches any identifier numbered in the numbering process, and returns the SYM_null when the identifier "id" does not match any identifier numbered in the numbering process.

When the variable "sym_id" is not the SYM null, and as well as the corresponding item of the fast offset table is the SYM_null, by a description "d36", a remainder (mod) when dividing the variable "sym_id" by the SIZE_OF_OFFSET_TABLE is set as a variable "fastSlot", a variable "sym_id" is set as the variable "fastSlot"th id number value of the fast offset table of the hidden type data (hidden type) indicated by the variable "newHiddenType", and a variable "offset" (set by the description "d31") as an offset value.

By a description "d37", a method "addTransition(id,newHiddenType)" of the hidden type data (hidden type) indicated by the variable "hidden type" is executed and a new transition is set.

By a description "d38", the variable "newHiddenType" is set as the pointer "hidden type" of the object "obj" and the hidden type data which is referred to by the object "obj" is updated.

By a description "d39", a method "values_append(value)" of the object "obj" is performed and a write value is set at an end of the slot table.

Next, referring back to FIG. 9, a code generation process (when there exists a table or the like which is to be referred to in the code, the table or the like is also generated) for reading in which the property is appointed by the character string is performed (step S105). Specifically, for example, a code as illustrated in FIG. 12 is generated.

By a description "d41" illustrated in FIG. 12, reading using the hash table is performed. A definition of the reading process "SlowLookup(obj,id)" using the hash table is the same as that illustrated in FIG. 10B.

Next, referring back to FIG. 9, a code generation process (when there exists a table or the like which is to be referred to in the code, the table or the like is also generated) for writing in which the property is appointed by the character string is performed (step S106). Specifically, for example, a code as illustrated in FIG. 13 is generated.

By a description "d51" illustrated in FIG. 13, a function "HASH_TABLE_LOOKUP" is performed accompanied with the offset hash table of the hidden type data (hidden type) indicated by the pointer "hidden type" of the object "obj" and the identifier "id", the result is set as a variable "slot", and whether the variable "slot" is not null (whether an active result is obtained) is determined.

When the variable "slot" is not null, by a description "d52", a write value is set as a "slot"th value of the slot table indicated by the pointer "entries" of the object "obj".

When the variable "slot" is null, by a description "d53", a new property is added. A definition of a process of adding a new property "NewProperty(obj,id,value)" is the same as that illustrated in FIG. 11B.

The codes illustrated in FIG. 10A to FIG. 13 are, finally, converted to the object code.

(Summary)

As described above, according to the embodiment, a high-speed access to a property can be actualized when executing compiled object code in a static compiler, because it is possible to immediately access a slot table when a property corresponding to a fast offset table exists, without referring to a hash table by which a process speed becomes slow. According to the embodiment, a high-speed access to a property can be actualized when executing a compiled object code in a static compiler.

The present invention has been explained by a preferred embodiment. Although a preferred embodiment of the present invention has been specifically illustrated and described, it is to be understood that minor modifications may be made therein without departing from the spirit and scope of the invention as defined by the claims.

The present invention is not limited to the specifically disclosed embodiments.

What is claimed is:

1. A data processing apparatus that generates an object code from a source code, comprising:
   a computer processor programmed to execute a process including:
   setting, for an access to a property of an object included in the source code, an offset of a one-dimensional array that stores a value in correspondence with the property in an offset table of hidden type data provided to correspond to the object,
   accessing the property via the offset table of hidden type data, and
   generating a code to access the property via a hash table for a case when the access to the property via the offset table of hidden type data cannot be performed.

2. A non-transitory computer-readable recording medium having recorded thereon a program that causes a computer to function as:
   a unit that sets, for an access to a property of an object included in the source code, an offset of a one-dimensional array that stores a value in correspondence with a property in an offset table of hidden type data provided to correspond to the object, accesses the property via the offset table of hidden type data, and generates a code to access the property via a hash table for a case when the access to the property via the offset table of hidden type data cannot be performed.

* * * * *